United States Patent [19]
Yamagata

[11] Patent Number: 5,442,781
[45] Date of Patent: Aug. 15, 1995

[54] SYSTEM FOR GENERATING A SEARCH FORMULA BY ACCESSING SEARCH TERMS ON THE BASIS OF A TRAINING SET OF PERTINENT AND NON-PERTINENT OBJECTS

[75] Inventor: Kanako Yamagata, Tokyo, Japan

[73] Assignee: NEC Corporation, Tokyo, Japan

[21] Appl. No.: 980,702

[22] Filed: Nov. 24, 1992

[30] Foreign Application Priority Data

Nov. 29, 1991 [JP] Japan ................................ 3-340360

[51] Int. Cl.⁶ ............................................ G06F 17/30
[52] U.S. Cl. .............................. 395/600; 364/DIG. 1; 364/282.1; 364/282.3; 364/283.3
[58] Field of Search ..................... 395/600; 364/419.19

[56] References Cited
U.S. PATENT DOCUMENTS

| | | | |
|---|---|---|---|
| 4,554,631 | 11/1985 | Reddington | 364/403 |
| 4,839,853 | 6/1989 | Deerwester et al. | 395/600 |
| 4,956,774 | 9/1990 | Shibamiya et al. | 395/600 |
| 5,091,852 | 2/1992 | Tsuchida et al. | 395/600 |
| 5,222,234 | 6/1993 | Wang et al. | 395/600 |
| 5,265,065 | 11/1993 | Turtle | 395/600 |
| 5,274,749 | 12/1993 | Evans | 395/63 |
| 5,301,109 | 4/1994 | Landauer et al. | 364/419.19 |
| 5,321,833 | 6/1994 | Chang et al. | 395/600 |

OTHER PUBLICATIONS

Ebinuma, "On-Line High Performance Automatic Document Retrieval Using Pertinent Information," *Journal of Information Processing and Management*, vol. 27, No. 8, pp. 692–703 (1984).

*Primary Examiner*—Thomas G. Black
*Assistant Examiner*—Wayne Amsbury
*Attorney, Agent, or Firm*—Foley & Lardner

[57] ABSTRACT

An apparatus for automatically generating a search formula uses pertinent data and non-pertinent data given by the user. Suitable search terms are selected from the pertinent data on the basis of the term appearance ratios only in the pertinent data and in the given data. The respective effectiveness values of the search terms are calculated by using the number of pieces of pertinent data containing the term and the number of pieces of given data containing the term. Among the sums of the effectiveness values of the search terms included in respective pieces of pertinent data, the smallest sum is decided to be the threshold of effectiveness. Finally, the search formula consisting of search terms combined is generated on the basis of the threshold of effectiveness and the respective effectiveness values of the search terms.

20 Claims, 4 Drawing Sheets

FIG. 2

| PERTINENT DATA (1) | CANCER, PREVENTION, SMOKING, LUNG CANCER, VITAMIN C |
| --- | --- |
| PERTINENT DATA (2) | CANCER, PREVENTION, VEGETABLE FIBER, UNBALANCED DIET, LARGE INTESTINE CANCER |
| PERTINENT DATA (3) | CANCER, PREVENTION, UNBALANCED DIET |

FIG. 3

| TERM | THE NUMBER OF PIECES OF PERTINENT AND NON-PERTINENT DATA CONTAINING THE RELEVANT TERM | THE NUMBER OF PIECES OF PERTINENT DATA CONTAINING THE RELEVANT TERM |
|---|---|---|
| CANCER | 6 | 3 |
| PERVENTION | 4 | 3 |
| SMOKING | 6 | 1 |
| LUNG CANCER | 5 | 1 |
| VITAMIN C | 1 | 1 |
| VEGETABLE FIBER | 2 | 1 |
| UNBALANCED DIET | 7 | 2 |
| LARGE INTESTINE CANCER | 5 | 1 |

SYSTEM FOR GENERATING A SEARCH FORMULA BY ACCESSING SEARCH TERMS ON THE BASIS OF A TRAINING SET OF PERTINENT AND NON-PERTINENT OBJECTS

BACKGROUND OF THE INVENTION

This invention relates to an information retrieval system, and in particular to an apparatus which automatically generates search formulae in the basis of given pertinent data and non-pertinent data. More particularly, the invention relates to an apparatus which automatically generates a search formula resulting in high pertinence by selecting or combining terms that have the possibility of retrieving as many pertinent data as possible from the given data consisting of pertinent data and non-pertinent data.

In an information retrieval system, an user is generally required to form a search formula by combining terms that represent the user's need for retrieval, using logical operators such as AND and OR, and then the retrieval is performed when the search formula is fed into the retrieval system. If the user is not satisfied with the result of the retrieval because of less than expected amount of needed data, the user is supposed to make another search formula and retrieve the data again.

One of the methods for automatically generating a search formula on the basis of pertinent data was proposed by Yukio Ebinuma ("On-Line High Performance Automatic Document Retrieval Using Pertinent Information" *JOURNAL OF INFORMATION PROCESSING AND MANAGEMENT*, Vol.27, No. 8, pp. 692–703, 1984). In this method, the user selects in advance, for example, 10 search terms from 10 pieces of pertinent data that are given by the user. Then, the effectiveness value of a search term which represents the capability of searching the pertinent data using the search term is calculated by the following formula:

EFFECTIVENESS VALUE=(The number of pieces of pertinent data containing the search term)/(The number of pieces of data containing the search term in the database concerned).

On the basis of the effectiveness values, the search terms are joined together by the AND operator to produce one or more partial search formulae, that are in turn combined using the OR operator to generate the final search formula.

However, in the above-mentioned conventional retrieval system, in calculating the effectiveness values, the data base must be repeatedly searched for each search term in order to examine the number of pieces of data containing the search term in the data base, which would inconveniently consume much time. Moreover, the search terms should be chosen based on the judgment of the user, so that as the number of search terms in the pertinent data increases, a burden to the user would also increase.

It is an object of the present invention to eliminate the drawbacks of the conventional information retrieval apparatus and to provide an information retrieval apparatus which can retrieve the objective information quickly, easily and with high precision.

SUMMARY OF THE INVENTION

This invention provides an apparatus which is capable of automatically generating a search formula suitable for retrieving the pertinent information. More particularly, using the pertinent data and the non-pertinent data given by the user, the apparatus selects suitable search terms from the pertinent data on the basis of the term appearance ratios, calculates the respective effectiveness values of the search terms, determines the threshold of effectiveness value, and generates a final search formula where the search terms are combined on the basis of the threshold and the effectiveness values. The apparatus is comprised of the following units roughly corresponding to the respective functions described above.

The apparatus inputs data via an input unit, the data consisting of pertinent data and non-pertinent data that are given by an user of the information retrieval system. The pieces of pertinent data satisfy and the pieces of non-pertinent data do not satisfy the need of the user.

A search term selection unit obtains the terms from the pertinent data to store them in a pertinent data table and selects search terms among the terms stored in the pertinent data table by comparing the term appearance ratio only in the pertinent data to the term appearance ratio in the given data. More particularly, the term is selected as the search term when the term appearance ratio only in the pertinent data is higher than the term appearance ratio in the given data.

An effectiveness calculation unit calculates the respective effectiveness values of the search terms on the basis of the pertinent data and the non-pertinent data. The selected search terms and their effectiveness values are stored in a search term table.

A threshold determination unit determines a threshold of effectiveness referring to the pertinent data table and the search term table. In detail, among the sums of the effectiveness values of the search terms included in respective pieces of pertinent data, the smallest sum is set as the threshold of effectiveness.

The search formula generation unit generates a search formula on the basis of the respective effectiveness values of the search terms and the threshold determined by the threshold determination unit. In more detail, referring to the search term table, the search formula generation unit finds the search terms having the effectiveness values equal to or greater than the threshold of effectiveness. If there is no such search term, the unit goes on to find a combination of search terms having the sum of the effectiveness values of the search terms equal to or greater than the threshold of effectiveness. Such search terms or such combinations each having the search terms combined by the AND operator are stored as the partial search formulae into a partial search formula table, which formulae are in turn combined by the OR operator to form a final search formula.

BRIEF DESCRIPTION OF THE DRAWINGS

FIG. 2 illustrates a pertinent data table which stores the pertinent data input thereto.

FIG. 3 illustrates the number of pieces of pertinent and non-pertinent data containing the search term and the number of pieces only of pertinent data containing the search term.

DETAILED DESCRIPTION

One embodiment of the information retrieval apparatus according to the present invention will be explained with references to FIGS. 1-5.

Figure 1:
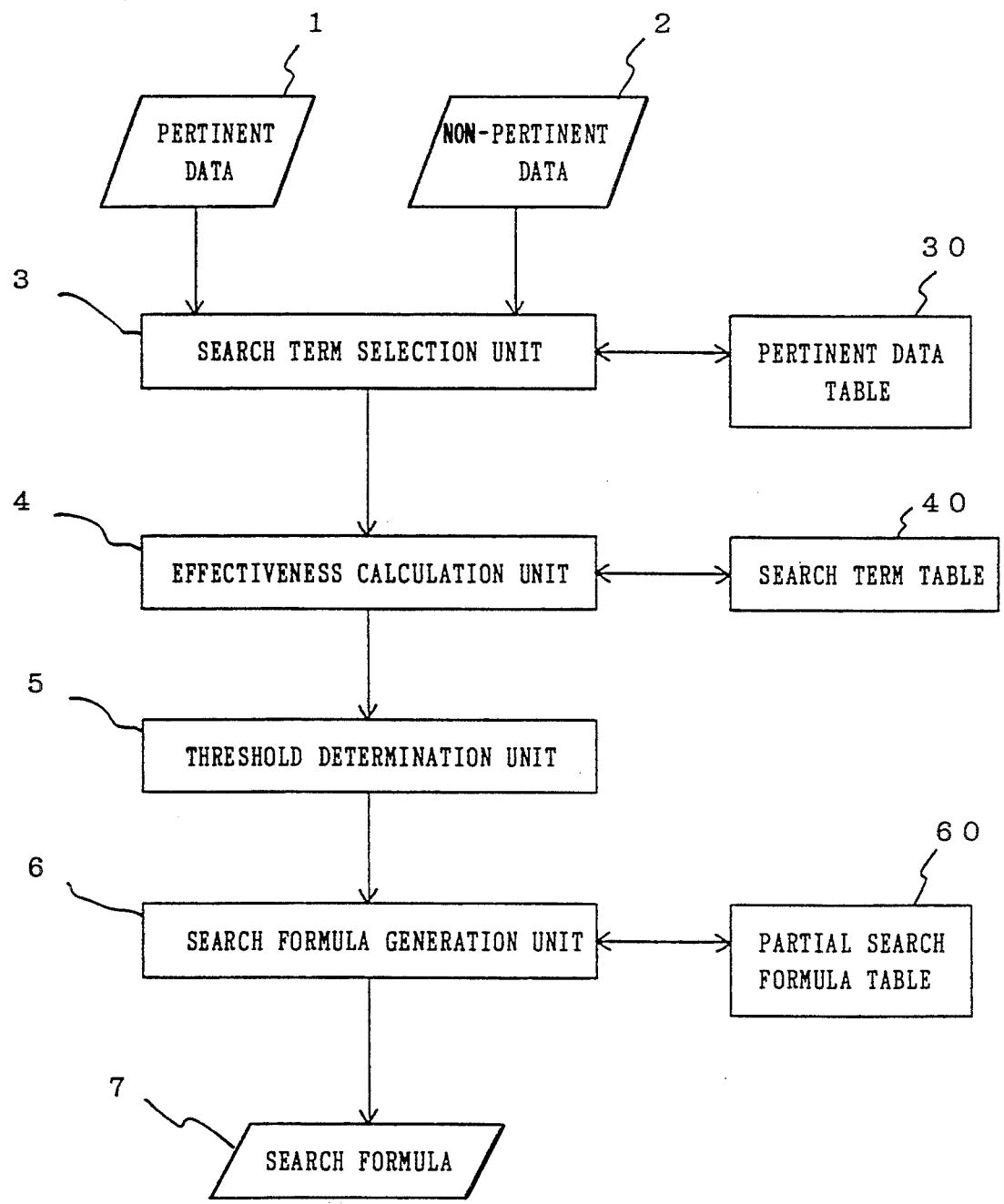
FIG. 1 is a block diagram indicative of an embodiment of the present invention.

Referring to FIG. 1, the apparatus has a search term selection unit 3 which reads in both the pertinent data 1 and the non-pertinent data 2 where the pertinent data 1 is judged to meet the user's need and the non-pertinent data is not. The search term selection unit 3 also stores the terms appearing in the pertinent data 1 into a pertinent data table 30 and selects the search terms from the stored terms. The apparatus also includes an effectiveness calculation unit 4 which calculates the respective effectiveness values of the search terms selected by the search term selection unit 3 and stores the search terms and their effectiveness values into a search term table 40. A threshold determination unit 5 sums the effectiveness values of the search terms in each piece of pertinent data to determine a threshold of effectiveness value. Finally, the apparatus includes a search formula generation unit 6 which generates a search formula 7 on the basis of the threshold determined by the threshold determination unit 5.

The details of each function of the above-mentioned elements will be explained hereinafter.

(a) The search term selection unit 3 stores all the terms that have appeared in the pertinent data 1 into the pertinent data table 30, and calculates the number of pieces of pertinent and non-pertinent data 1 and 2 where each of the terms appears and the number of pieces only of pertinent data 1 where the term appears. The term appearance ratio in the pertinent and the non-pertinent data 1 and 2 and the term appearance ratio only in the pertinent data 1 are calculated on the basis of the following expression:

(The term appearance ratio in the pertinent and the non-pertinent data 1 and 2)=(The number of pieces of pertinent and non-pertinent data 1 and 2 containing the term)/(The number of pieces of pertinent and non-pertinent data 1 and 2)   (1)

(The term appearance ratio only in the pertinent data 1)=(The number of pieces of pertinent data 1 containing the term)/(The number of pieces of pertinent data 1)   (2)

If the term appearance ratio only in the pertinent data 1 is higher than the term appearance ratio in the pertinent and the non-pertinent data 1 and 2, then the term is selected as a search term.

(b) In the effectiveness calculation unit 4, the effectiveness value of a particular term is calculated in accordance with the expression shown below:

EFFECTIVENESS VALUE=(1+the number of pieces of pertinent data 1 containing the term)/(2+the number of pieces of pertinent and non-pertinent data 1 and 2 containing the term)   (3)

(c) The threshold determination unit 5, referring to the search term table 40, sums the effectiveness values of the search terms contained in the respective pieces of the pertinent data 1. Among the resulting sums, the smallest sum is decided to be the threshold of effectiveness.

(d) The search formula generation unit 6 determines whether the effectiveness value of each of the search terms stored in the search term table 40 is equal to or greater than the threshold set by the threshold determination unit 5. The unit 6 then stores the search terms having effectiveness values equal to or greater than the threshold into the partial search formula table 60. If not all search terms are stored in the partial search formula table 60, the unit 6 goes on to start finding every combination of any two search terms the sum of the effectiveness values of which is greater than the threshold. Having found such two search terms, the unit 6 combines them using the AND operator, and stores the result as a partial search formula in the partial search formula table 60. This process continues while increasing the number of search term combination to 3 terms and then to 4 terms until all of the search terms are stored in the partial search formula table 60. After all the partial search formulae found are stored in the partial search formula table 60, the partial search formulae are combined using the OR operator to generate the resulting final search formula 7.

The operation of this embodiment will be explained hereinafter.

1) The user inputs pertinent data 1 and non-pertinent data 2 into the search term selection unit 3.

As an example, assume that three pieces of pertinent data 1 and five pieces of non-pertinent data 2 are input into the search term selection unit 3.

2) The search term selection unit 3 stores the terms which appear in the input pertinent data 1 into the pertinent data table 30. As in the example shown in FIG. 2, the terms appearing in respective pieces of pertinent data 1 are stored into the pertinent data table 30: "cancer", "prevention", "smoking", "lung cancer" and "vitamin C" as the pertinent data (1); "cancer", "prevention", "vegetable fiber", "unbalanced diet" and "large intestine cancer" as the pertinent data (2); and "cancer", "prevention" and "unbalanced diet" as the pertinent data (3).

3) The search term selection unit 3 examines the number of pieces of pertinent and non-pertinent data 1 and 2 including the respective terms obtained in the above process 2).

Now, suppose, as shown in FIG. 3, that the numbers of pieces of pertinent and non-pertinent data 1 and 2 containing each term are: 6 for "cancer", 4 for "prevention", 6 for "smoking", 5 for "lung cancer", 1 for "vitamin C", 2 for "vegetable fiber", 7 for "unbalanced diet", and 5 for "large intestine cancer" among 8 pieces of pertinent and non-pertinent data 1 and 2. Suppose, as shown in FIG. 3, that the numbers of pieces of pertinent data 1 containing each term are: 3 for "cancer", 3 for "prevention", 1 for "smoking", 1 for "lung cancer", 1 for "vitamin C", 1 for "vegetable fiber", 2 for "unbalanced diet" and 1 for "large intestine cancer".

4) The search term selection unit 3, using the formula (1), calculates the term appearance ratios of the respective terms in pertinent and non-pertinent data 1 and 2. The results in the above example are as follows: $6/8=0.75$ for "cancer", $4/8=0.5$ for "prevention", $6/8=0.75$ for "smoking", $5/8=0.625$ for "lung cancer", $1/8=0.125$ for "vitamin C", $2/8=0.25$ for "vegetable fiber", $7/8=0.875$ for "unbalanced diet", and 5/8=0.625 for "large intestine cancer".

5) The search term selection unit 3, using the formula (2), calculates the term appearance ratios of the respective terms only in the pertinent data 1. The results are herein as follows: 3/3=1.0 for "cancer", 3/3=1.0 for "prevention", 1/3=0.33 for "smoking", 1/3=0.33 for "lung cancer", 1/3=0.33 for "vitamin C", 1/3=0.33 for "vegetable fiber", 2/3=0.67 for "unbalanced diet", and 1/3=0.33 for "large intestine cancer".

6) The search term selection unit 3 selects as a search term the term whose term appearance ratio only in the pertinent data 1 is greater than its term appearance ratio in the pertinent and non-pertinent data 1 and 2. In the example, four terms of "cancer", "prevention", "vitamin C" and "vegetable fiber" are selected as the search terms.

Figure 4:
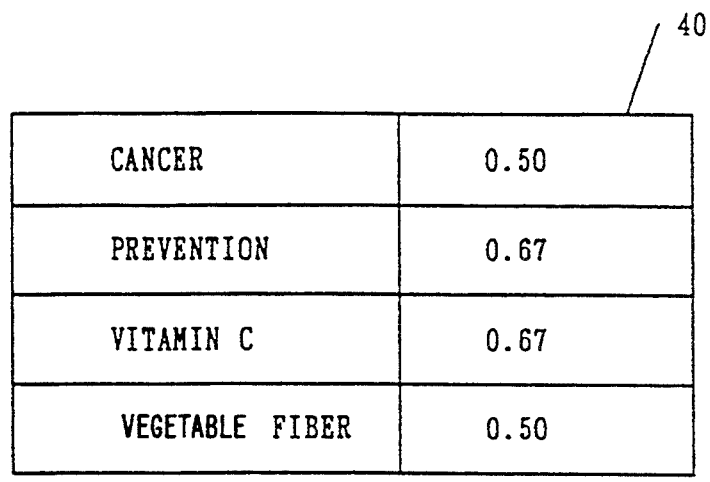
FIG. 4 illustrates a search term table which stores the search terms and their effectiveness values to search the pertinent data.
Figure 5:
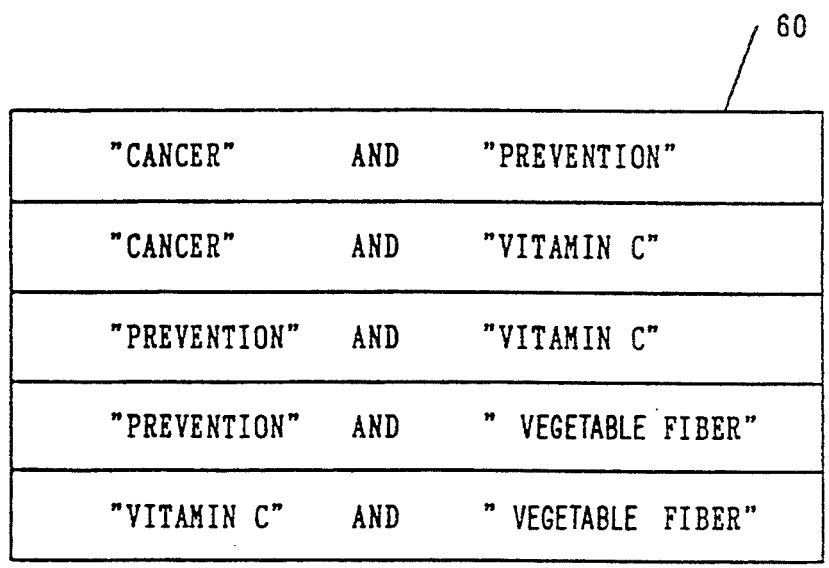
FIG. 5 illustrates a partial search formula table which stores partial search formulae each including the suitable search terms combined by the AND operator.

7) The effectiveness calculation unit 4, using the above-mentioned formula (3), calculates the effectiveness value of a search term which represents the capability of the search term to find the pertinent data, and stores the search term and its effectiveness value in the search term table 40. In this example as shown in FIG. 4, the resulting contents of the search term table 40 are as follows;
(3+1)/(6+2)=0.5 for "Cancer",
(3+1)/(4+2)=0.67 for "prevention",
(1+1)/(1+2)=0.67 for "vitamin C", and
(1+1)/(2+2)=0.50 for "vegetable fiber".

8) The threshold determination unit 5 sums the effectiveness values of the search terms contained in the respective pieces of pertinent data referring to the pertinent data table 30 and the search term table 40. Among the resulting sums the smallest is decided to be the threshold of effectiveness.

In the example, the piece of pertinent data (1) contains three search terms "cancer", "prevention" and "vitamin C" as shown in FIG. 1. Their effectiveness values are 0.5, 0.67 and 0.67, respectively, as shown in FIG. 4, summing up to 1.84. Similarly, the sum is 1.67 for the piece of pertinent data (2) and 1.17 for the piece of pertinent data (3). Because the value of 1.17 for the data (3) is the lowest among the above sums in the three pieces of pertinent data, this lowest sum is set as the threshold of effectiveness.

9) The search formula generation unit 6 finds the search terms having the effectiveness values equal to or greater than the set threshold (herein 1.17), referring to the search term table 40. Since there is no such search term herein, a search is made for a combination of two search terms where the sum of their effectiveness values is equal to or greater than the threshold. For example, in the combination of search terms "cancer" and "prevention", the sum of their effectiveness values 0.5 and 0.67 is 1.17, which is equal to the threshold 1.17. Moreover, each of the combinations, "cancer" and "vitamin C", "prevention" and "vitamin C", "prevention" and "vegetable fiber", and "vitamin C" and "vegetable fiber" exhibit the sums of effectiveness values equal to or greater than the threshold. These combinations each two search terms being combined by the AND operator are then stored as partial search formulae in the partial search formula table 60. Since all the search terms "cancer", "prevention", "vitamin C" and "vegetable fiber" appear in the partial retrieval formulae, no other partial search formula will be generated. These partial search formulae are combined by the OR operator to generate the search formula 7 shown below:

"cancer" AND "prevention" OR "cancer" AND "vitamin C" OR "prevention" AND "vitamin C" OR "prevention" AND "vegetable fiber" OR "vitamin C" AND "vegetable fiber".

As described above, simply given pertinent and non-pertinent data that respectively satisfy and do not satisfy the need of the user, the present invention can automatically generate the search formula more suitable for searching the pertinent data. Thus, this invention provides an information retrieval system which is capable of retrieving the desired information quickly, easily and with high precision.

What is claimed is:

1. Apparatus for generating a search formula in an information retrieval system comprising:
   input means for inputting given data consisting of pertinent data and non-pertinent data, said pertinent data and said non-pertinent data being designated by a user, said pertinent data and said non-pertinent data comprising pieces of data, each piece of said pertinent data satisfying a need of said user, each piece of said non-pertinent data not satisfying the need of said user;
   search term selection means for selecting search terms among the terms included in the pertinent data on the basis of first and second term appearance ratios, said first term appearance ratio being a ratio of a number of pieces of said given data containing said particular term to a total number of pieces of said given data, said second term appearance ratio being a ratio of a number of pieces of pertinent data containing said particular term to a total number of pieces of said pertinent data;
   effectiveness calculation means for calculating respective effectiveness values of the search terms selected by the search term selection means, said effectiveness calculation means calculating said effectiveness of each selected search term based on a number of pieces of said pertinent data containing the search term and the total number of pieces of said given data;
   threshold determination means for determining a threshold of effectiveness by using the effectiveness values of the search terms included in respective pieces of pertinent data; and
   search formula generation means for generating a search formula on the basis of the respective effectiveness values of the search terms and the threshold determined by the threshold determination means, said search formula comprising the selected search terms combined by boolean operators.

2. Apparatus according to claim 1, wherein the search term selection means selects as a search term the term whose term appearance ratio only in the pertinent data is higher than the term appearance ratio in the given data.

3. Apparatus according to claim 1, wherein the effectiveness calculation means calculates the respective effectiveness values of the search terms using the following formula:
(effectiveness value)=(1+the number of pieces of pertinent data containing the term)/(2+the number of pieces of given data containing the term).

4. Apparatus according to claim 1, wherein the threshold determination means determines the threshold of effectiveness by using the sum of the effectiveness values of the search terms included in respective pieces of pertinent data.

5. Apparatus according to claim 4, wherein the threshold determination means determines the threshold of effectiveness such that among the sums of the effectiveness values of the search terms included in respective pieces of pertinent data, the smallest sum is set as the threshold of effectiveness.

6. Apparatus according to claim 1, wherein the search formula generation means generates a search formula by using the search term having the effectiveness values equal to or greater than the threshold of effectiveness determined by the threshold determination means.

7. Apparatus according to claim 1, wherein the search formula generation means generates a search formula by using the combination of search terms having the sum of the effectiveness values of the search terms equal to or greater than the threshold of effectiveness when there is no search term having the effectiveness values equal to or greater than the threshold of effectiveness.

8. Apparatus according to claim 1, wherein the search formula generation means generates a search formula comprising a plurality of partial search formulae combined by the OR operator.

9. Apparatus according to claim 8, wherein the respective partial search formulae are comprised of the search term that has the effectiveness value equal to or greater than the threshold of effectiveness.

10. Apparatus according to claim 8, wherein the respective partial search formulae are comprised of the combination of search terms that has the sum of the effectiveness values of the search terms equal to or greater than the threshold of effectiveness, said search terms being combined by the AND operator.

11. A method of generating a search formula in an information retrieval system comprising the steps of:
receiving from a user given data containing pieces of pertinent data and pieces of non-pertinent data, each piece of pertinent data satisfying a user need, each piece of non-pertinent data not satisfying the user need, each piece of given data containing at least one term;
selecting search terms from the terms in the pertinent data on the basis of first and second term appearance ratios for each term, the first term appearance ratio being a ratio of a number of pieces of given data containing the term to a total number of pieces of given data, the second term appearance ratio being a ratio of a number of pieces of pertinent data containing the term to a total number of pieces of pertinent data;
calculating effectiveness values for each of the selected search terms based on a number of pieces of pertinent data containing the selected search term and the total number of pieces of given data;
determining an effectiveness threshold using the calculated effectiveness values; and
generating the search formula based on the effectiveness values and the threshold.

12. A method according to claim 11, wherein the selecting step selects terms for which the second term appearance ratio is higher than the first term appearance ratio as selected search terms.

13. A method according to claim 11, wherein the step of calculating effectiveness values for each of the selected search terms uses the following formula:
(effectiveness value)=(1+the number of pieces of pertinent data containing the term)/(2+the number of pieces of given data containing the term).

14. A method according to claim 11, wherein the step of determining the effectiveness threshold uses the sum of the effectiveness values of the search terms in each respective piece of pertinent data.

15. A method according to claim 14, wherein the effectiveness threshold is set to the smallest sum of effectiveness values.

16. A method according to claim 11, wherein the step of generating the search formula uses search terms having effectiveness values equal to or greater than the effectiveness threshold.

17. A method according to claim 16, wherein the step of generating the search formula uses combinations of search terms having a sum of effectiveness values equal to or greater than the effectiveness threshold when no search term has an effectiveness value equal to or greater than the effectiveness threshold.

18. A method according to claim 11, wherein the step of generating the search formula uses a plurality of partial search formulae combined by an OR operator.

19. A method according to claim 18, wherein each search term having an effectiveness value equal to or greater than the effectiveness threshold is a partial search formula.

20. A method according to claim 18, wherein combinations of search terms being combined by an AND operator and having a sum of effectiveness values equal to or greater than the effectiveness threshold are partial search formulae.

* * * * *